US012615383B2

(12) United States Patent　　　　(10) Patent No.:　US 12,615,383 B2
Zhang et al.　　　　　　　　　　　　(45) Date of Patent:　　Apr. 28, 2026

(54) HARDWARE-BASED VIDEO CODEC CONTROL

(71) Applicants:ATI TECHNOLOGIES ULC, Markham (CA); ADVANCED MICRO DEVICES, INC., Santa Clara, CA (US)

(72) Inventors: Xingyue Zhang, Markham (CA); Krzysztof Socha, Mississauga (CA); Catalin Beju, Markham (CA); Kathirkamanathan Nadarajah, Markham (CA); Gia Tung Phan, Markham (CA); Weimin Chen, Markham (CA); Tow Wang, Santa Clara, CA (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 432 days.

(21) Appl. No.: 18/073,725

(22) Filed: Dec. 2, 2022

(65) Prior Publication Data

US 2024/0187619 A1　　Jun. 6, 2024

(51) Int. Cl.
*H04N 19/42*　　　　(2014.01)
(52) U.S. Cl.
CPC ................................... *H04N 19/42* (2014.11)
(58) Field of Classification Search
None
See application file for complete search history.

(56) References Cited

U.S. PATENT DOCUMENTS

| | | | | | |
|---|---|---|---|---|---|
| 5,646,618 | A | * | 7/1997 | Walsh | H04N 19/176 375/E7.176 |
| 6,598,074 | B1 | * | 7/2003 | Moller | G10H 1/0058 370/263 |
| 6,927,710 | B2 | * | 8/2005 | Linzer | H04N 19/40 375/E7.093 |
| 7,644,103 | B2 | * | 1/2010 | Smith | H04L 67/568 725/87 |

(Continued)

FOREIGN PATENT DOCUMENTS

| | | | | | |
|---|---|---|---|---|---|
| WO | WO-2012120888 | A1 | * | 9/2012 | H04N 19/103 |
| WO | WO 2020/242738 | A | * | 12/2020 | H04N 19/56 |

(Continued)

OTHER PUBLICATIONS

USENIX. "On the Usability of Authenticity Checks for Hardware Security Tokens." (Aug. 11-13, 2021). Retrieved online Mar. 4, 2025. https://www.usenix.org/system/files/sec21-pfeffer.pdf (Year: 2021).*

(Continued)

*Primary Examiner* — James A Reagan

(57)　　　　　　　　ABSTRACT

A compute device implements a technique for facilitating selective access to hardware codec resources. The compute device executes, in a trusted execution environment, firmware for controlling graphics hardware of a device that supports a plurality of video codecs. The compute device obtains codec control data specific to the device from a remote system and then configures the firmware to implement a codec policy for selectively providing access to the plurality of video codecs based on the codec control data.

20 Claims, 6 Drawing Sheets

(56)                References Cited

U.S. PATENT DOCUMENTS

| | | | | | |
|---|---|---|---|---|---|
| 8,099,508 | B2 * | 1/2012 | Mao | H04N 21/8355 | |
| | | | | | 709/227 |
| 8,799,994 | B2 * | 8/2014 | Barton | H04L 67/10 | |
| | | | | | 726/1 |
| 8,869,235 | B2 * | 10/2014 | Qureshi | H04L 67/10 | |
| | | | | | 713/153 |
| 8,989,263 | B2 * | 3/2015 | Hsiun | H04N 19/60 | |
| | | | | | 375/240.04 |
| 9,486,703 | B2 * | 11/2016 | Rofougaran | H04W 4/029 | |
| 10,819,566 | B2 * | 10/2020 | Chew | H04L 67/34 | |
| 10,869,062 | B2 * | 12/2020 | Egilmez | H04N 19/157 | |
| 11,178,432 | B2 * | 11/2021 | Ilhan | H04N 21/2143 | |
| 11,197,010 | B2 * | 12/2021 | Sun | H04N 19/124 | |
| 11,425,393 | B1 * | 8/2022 | Wang | H04N 19/159 | |
| 11,825,090 | B1 * | 11/2023 | Said | H04N 19/149 | |
| 2004/0119814 | A1 * | 6/2004 | Clisham | H04N 21/440281 | |
| | | | | | 348/E7.083 |
| 2004/0228410 | A1 * | 11/2004 | Ameres | H04N 19/139 | |
| | | | | | 375/E7.113 |
| 2005/0047507 | A1 * | 3/2005 | Ju | H04N 19/159 | |
| | | | | | 375/E7.25 |
| 2006/0053004 | A1 * | 3/2006 | Ceperkovic | H04N 19/1883 | |
| | | | | | 704/221 |
| 2006/0072672 | A1 * | 4/2006 | Holcomb | H04N 19/136 | |
| | | | | | 375/E7.199 |
| 2006/0167903 | A1 * | 7/2006 | Smith | H04L 65/762 | |
| 2010/0017840 | A1 * | 1/2010 | Akins, III | H04N 21/443 | |
| | | | | | 725/131 |
| 2013/0128966 | A1 * | 5/2013 | Gao | H04N 19/157 | |
| | | | | | 375/240.12 |
| 2014/0007222 | A1 * | 1/2014 | Qureshi | H04L 67/10 | |
| | | | | | 726/16 |
| 2014/0033271 | A1 * | 1/2014 | Barton | H04W 12/64 | |
| | | | | | 726/1 |
| 2014/0369424 | A1 * | 12/2014 | Chuang | H04N 19/58 | |
| | | | | | 375/240.27 |
| 2018/0103261 | A1 * | 4/2018 | Sun | H04N 19/51 | |
| 2018/0324238 | A1 * | 11/2018 | Melenboim | H04N 21/234 | |
| 2019/0044794 | A1 * | 2/2019 | Chew | H04L 41/0672 | |
| 2019/0049912 | A1 * | 2/2019 | Poornachandran | G06F 30/343 | |
| 2019/0116361 | A1 * | 4/2019 | Rusanovskyy | H04N 19/198 | |
| 2019/0124333 | A1 * | 4/2019 | Roh | H04N 19/139 | |
| 2019/0320210 | A1 * | 10/2019 | Ilhan | G06F 21/575 | |
| 2020/0092586 | A1 * | 3/2020 | Wenger | H04N 19/177 | |
| 2020/0162758 | A1 * | 5/2020 | Cheong | G06T 9/004 | |
| 2020/0228779 | A1 * | 7/2020 | Kendrick | H04N 9/8715 | |
| 2020/0280725 | A1 * | 9/2020 | Zhu | H04N 19/103 | |
| 2021/0136078 | A1 * | 5/2021 | Barhudarian | H04L 63/08 | |
| 2022/0021891 | A1 * | 1/2022 | Chaudhari | H04N 19/53 | |
| 2022/0201320 | A1 * | 6/2022 | Karunaratne | G06V 20/41 | |
| 2022/0264168 | A1 * | 8/2022 | Dahl | H04L 65/612 | |
| 2022/0286736 | A1 * | 9/2022 | Guruva Reddiar | H04N 19/172 | |
| 2022/0310076 | A1 * | 9/2022 | Kumar | G10L 15/1822 | |
| 2023/0156225 | A1 * | 5/2023 | Koo | H04N 19/176 | |
| 2023/0293008 | A1 * | 9/2023 | Hedley | A61B 5/0077 | |

FOREIGN PATENT DOCUMENTS

| | | | | | |
|---|---|---|---|---|---|
| WO | WO-2020242738 | A1 * | 12/2020 | | H04N 19/56 |
| WO | WO-2024015665 | A1 * | 1/2024 | | G06N 3/044 |

OTHER PUBLICATIONS

DNI. "Insider Threat Overlays." (Sep. 1, 2018). Retrieved online Mar. 4, 2025. https://www.dni.gov/files/NCSC/documents/nittf/20190905-Insider-Threat-Overlays.pdf (Year: 2018).*

ARM. "ARM Firmware Suite Version 1.4 Reference Guide." (1999). Retrieved online Mar. 4, 2025. https://documentation-service.arm.com/static/5e95c5f518366b12b979eb29?token= (Year: 1999).*

* cited by examiner

158 ◄·········► CODEC TOKEN GENERATION PATH

160 ◄— — — —► CODEC CONTROL PATH

162 ◄———► VIDEO DATA PATH

156

HARDWARE-BASED VIDEO CODEC CONTROL

BACKGROUND

A business may manufacture or supply graphics hardware that provides hardware-implementation of multiple video codecs but would like to limit access to the one or more supported video codes for any of a variety of reasons. For example, the business or a vendor may have a subscription/royalty model in which a user must pay a one-time or recurring fee to access certain video codecs, or the business may sell multiple "versions" of the same device, with the difference between versions being which video codecs are enabled for a given version. As another example, a chip manufacturer may sell the same hardware to different vendors, and may want to limit the video codec functionality of the hardware based on vendor it is supplied to, or based on the system in which it is implemented.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

An application specific integrated circuit (ASIC), a system on a chip (SoC), a video card, or other discrete hardware device may employ one or more graphics processing units (GPUs), video memory, and other graphics (GFX) hardware to support a plurality of hardware-based video codecs for encoding or decoding video. However, for various reasons, such as for implementation of a subscription or royalty model or to limit certain codec functionality to only certain execution environments, a manufacturer or supplier of the discrete hardware device may seek to provide selective access to the hardware-based codec resources on a per-device basis. Conventional approaches to implementing selective codec access either rely on storage of security/control information in an untrusted or readily-accessible storage location and thus susceptible to unauthorized modification or are not sufficiently granular so as to permit unique codec control on an individual device basis. Accordingly, the following describes various implementations of a token-based video codec control technique based on the use of a video codec "token" obtained from an authorized server and which is used to configure a video codec policy to be employed by a firmware codec driver that executes in a trusted execution environment to manage graphics hardware resources and thus reduces the opportunities for malicious modification so as to bypass codec restrictions intended for the particular device. Moreover, in implementations, security and authentication procedures are employed for the video codec policy in the trusted execution environment such that the video codec token can be stored in unsecured memory without risk of modification while in such unsecured memory having the result of bypassing the intended codec restrictions.

Figure 1:
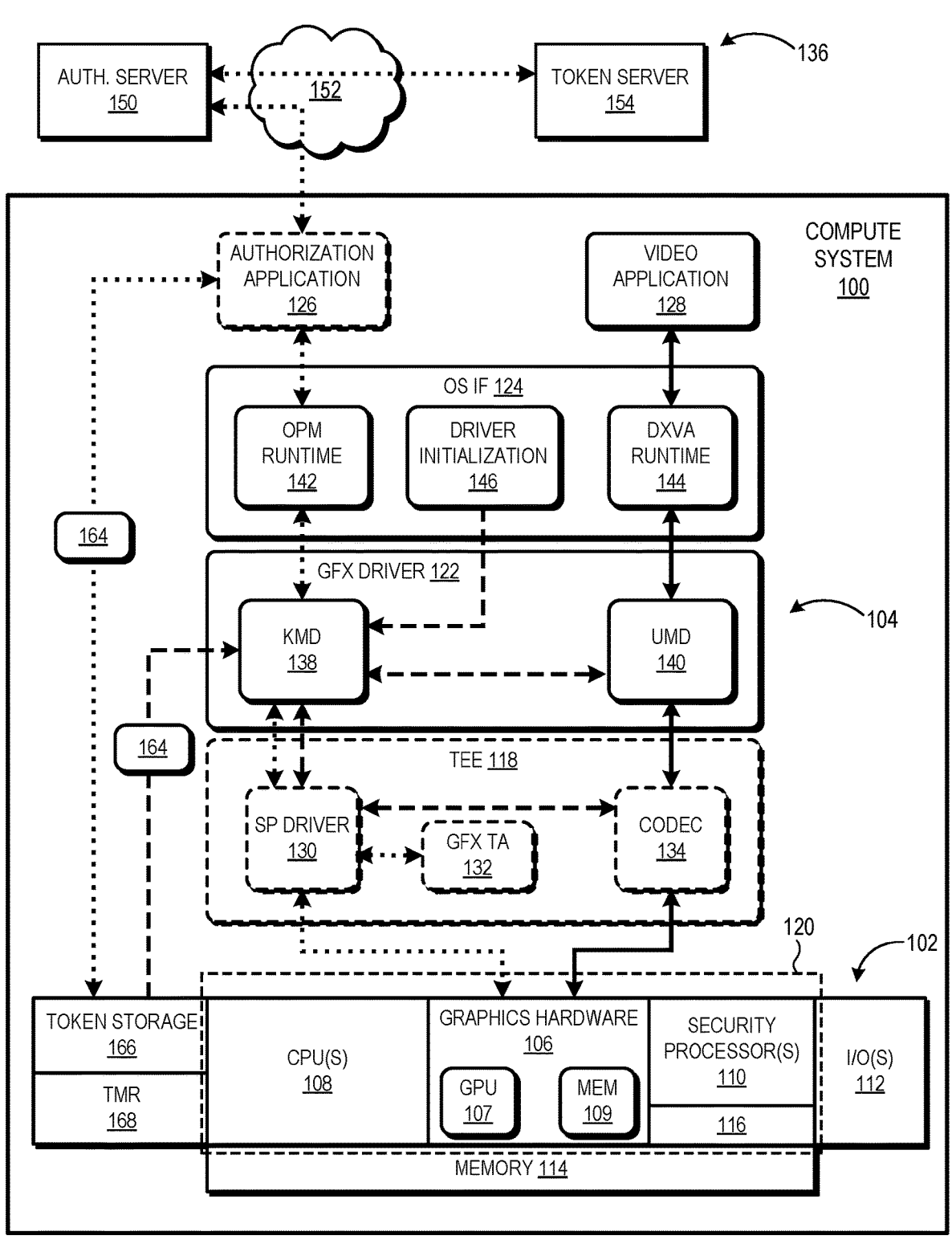
FIG. 1 is a block diagram of a compute system employing hardware-based video codec control in accordance with some embodiments.

FIG. 1 illustrates a compute system 100 employing token-based video codec control to set codec policy on a per-device basis in accordance with some embodiments. The compute system 100 includes hardware resources 102 and software resources 104. The hardware resources 102 include graphics hardware resources 106, one or more central processing units (CPUs) 108 or other general-purpose processors, one or more security processors 110, one or more input/output (I/O) devices 112, one or more system memories 114, and the like. The I/O devices 112 can include, for example, wired or wireless network interfaces, display controllers for coupling to a display, keyboards, mice, or other user I/O devices, and the like.

The graphics hardware resources 106 include hardware resources used to provide encoding/decoding functionality for a set of video codecs, including one or more graphics processing units (GPUs) 107, graphics memory 109, caches, busses, interfaces, and the like. The set of video codecs can include any of a variety of proprietary or standardized video codecs, such as an Motion Pictures Experts Group-4 (MPEG-4) Advanced Video Coding (AVC) codec (also known as a H.264 codec), an MPEG-H Part-2 High Efficiency Video Coding (HEVC) codec (also known as an H.265 codec), an MPEG-I Part-3 Versatile Video Coding (VVC) codec (also known as an H.266 codec), an AOMedia Video 1 (AV1) codec, a VP9 codec, and the like.

The security processor 110 is a co-processor that has access to one or more associated secure non-volatile memory (NVM) 116 (e.g., Flash memory, read-only memory, or both) which store secure firmware executed by the security processor 110 to provide a trusted execution environment (TEE), which is an isolated execution environment that provides a higher level of security than the general operating system (OS) environment through employment of mechanisms that limit access and which provide for enhanced code integrity and data integrity. An example of the security processor 110 is the Platform Security Processor (PSP) provided by Advanced Micro Devices, Inc.

In at least one implementation, at least one or more CPUs 108, some or all of the graphics hardware resources 106, and the security processor 110 and associated NVM 116 are implemented as a single hardware device 120, such as in an ASIC or other discrete device, in a graphics card, or the like. In this approach, the single hardware device 120 may be removed from one instance of the compute system 100 and placed into use in another instance of the compute system 100. As described herein, in some implementations, the token-based video codec control technique permits the codec resources to be provisioned once for this hardware device 120 and reusable thereafter in a different compute system without having to repeat the entire authentication, storage, and provisioning process again for the new compute system.

The software resources 104 include one or more sets or stacks of software represented by executable instructions, that when executed by one or more processors of the hardware resources 102 of the compute system 102, manipulate the compute system 102 to perform the various functions described herein. In the illustrated embodiment, the software resources 104 include the firmware stored in the NVM 116 and executed by the security processor 110 to implement a TEE (and thus this firmware is also referred to herein as TEE firmware 118), graphics driver software 122, operating system (OS) software including OS interface (IF) software 124, an authorization application 126, and a video application 128.

The TEE firmware 118 includes at least a security processor driver 130, a graphics trust assurance (TA) module 132, a codec driver 134. The TEE firmware 118 further includes the authorization application 126, although the authorization application 124 is illustrated outside of the TEE firmware 118 for ease of illustration with regard to corresponding control/data paths. As noted above, the TEE firmware 118 is executed by the security processor 110 to provide a TEE, and thus the various modules of the TEE firmware 118 are illustrated in FIG. 1 using dashed borders to indicate their TEE status. The security processor driver 128 operates as the general driver for interfacing with, and controlling, the hardware of the security processor 110, and serves as the primary interface between the security processor 110 and all other software resources outside of the TEE represented by a combination of the security processor 110, the TEE firmware 118, and the secure memory 116 associated with the security processor 110 that stores the TEE firmware 118. The graphics TA module 132 operates to provide various signing and validation processes for obtaining and validating a codec token, as described below. The codec driver 134 serves as the driver for controlling the graphics hardware resources 106 for performing encoding/decoding jobs on behalf of the video application 126. As described in greater detail below, the codec driver 134 operates to implement a codec policy specified by control information from an obtained video codec token, with this codec policy indicating which codec resources of the graphics hardware resources 106 are available for use by the compute system 100, and thus available for use by the video application 126. This can include policy indicating which video codecs can be used, and also may indicate certain parameters regarding an allowed video codec, such as permitted maximum bitrate, maximum pixel depth, etc. The authorization application 126 operates to obtain the video codec token for the hardware device 120 from a remote system 136.

The graphics driver software 122 includes one or more graphics drivers to interface between high-level software and the TEE firmware 118 and the graphics hardware resources 106. In the illustrated implementation, the compute system 100 employs a Microsoft Windows™ OS, and thus the graphics driver software 122 can include a kernel mode driver (KMD) 136 and a user mode driver (UMD 138), as known in the art.

The OS interface software 124 includes various software components that serve as the intermediary between user-level software applications, such as the video application 128, and the graphics driver software 122. For a Microsoft Windows™ OS, this can include, for example, an output protection manager (OPM) runtime application programming interface (API) 142 and a DirectX video acceleration (DXVA) API 144, as well as a driver initialization module 146. The OPM runtime API 142 is an API and associated device driver interface (DDI) that provides copy protection and other security measures for video signaling processed by the OS and lower software layers. The DXVA runtime API 144 is an API and associated DDI that operates as the interface for the video application 128 for the hardware acceleration resources for video processing requested by the video application 128, including one or both of video encoding or video decoding (referred to herein collectively or in the alternative as "encoding/decoding"). Although DXVA is the specification referenced for the runtime API 144, it will be appreciated that other hardware video acceleration interface specifications may be employed in place of DXVA using the guidelines provided herein.

In the depicted implementation, the remote system 136 for providing a video codec token representing the specific video codec policy to be employed for the hardware device 120 includes a two-server approach. An authentication server 150 serves to receive a token request from the compute system 100 via a network 152 (e.g., the Internet) in the form of a codec token challenge, validate the codec token challenge, and confirm the codec resources authorized for the hardware device 120. A token server 154 then generates the requested video codec token based on information supplied by the authentication server 150. This process is described in greater detail below.

Key 156 depicts the three primary control/data paths 158, 160, and 162 employed for the hardware-based video codec control technique employed for the compute system 100. A codec token generation path 158 represents the path by which the compute system 100 obtains a video codec token 164 from the remote system 156 and stores the video codec token in token storage 166 (e.g., a file system of a hard drive, in a system registry, etc.) for subsequent access. A codec control path 160 represents the path by which the stored video codec token is accessed from the token storage 166, authenticated, and the codec control information contained therein used to provision the codec driver 134 to implement the corresponding codec policy. A video data path 162 represents the path by which encoding/decoding jobs are submitted by the video application 128 to the codec driver 134 via the OS interface software 124 and the graphics driver software 122, and then filtered by the codec driver 134 according to the configured codec policy, with authorized encoding/decoding jobs being submitted to the graphics hardware resources 106 for processing, and the resulting encoded/decoded video data returned to the video application 128. The operations of these paths are described in greater detail below.

Figure 2:
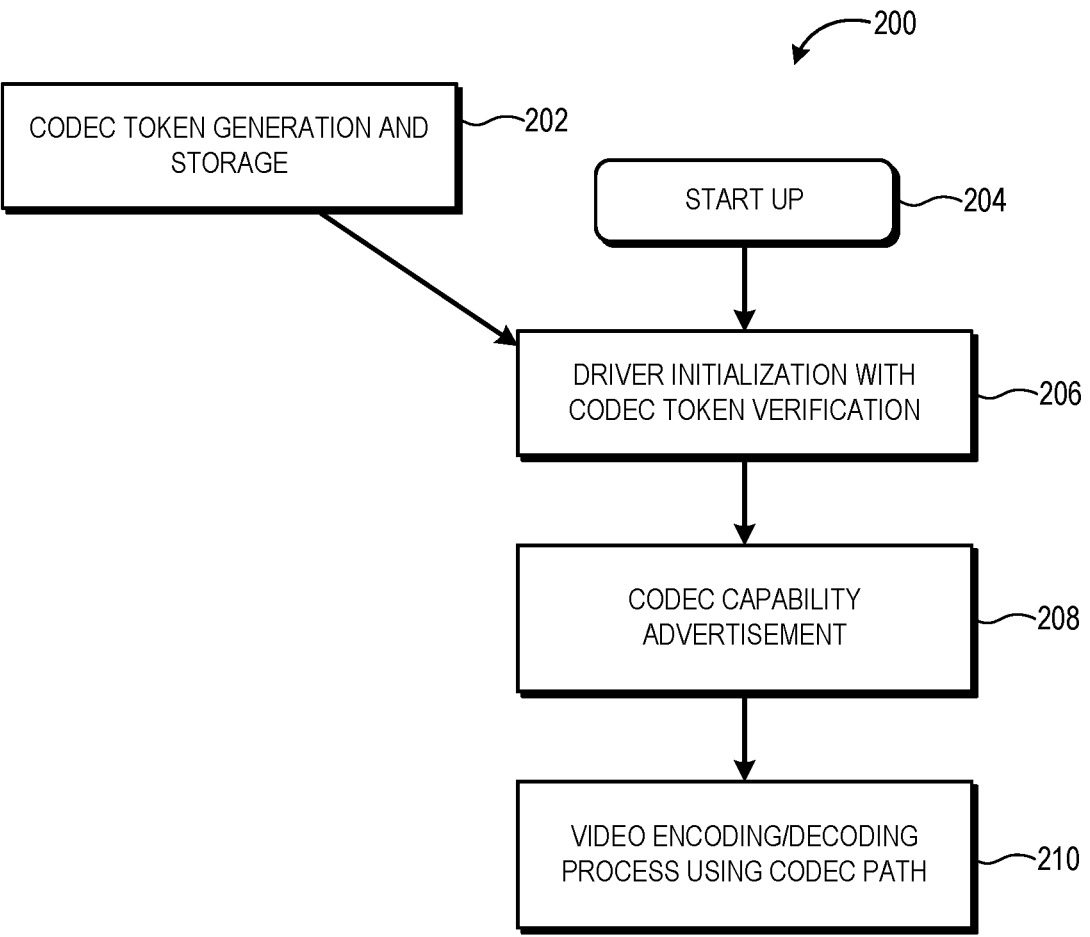
FIG. 2 is a flow diagram illustrating a method for hardware-based video codec control in the system of FIG. 1 in accordance with some embodiments.

FIG. 2 illustrates a method 200 for hardware-based video codec control in a compute system in accordance with some implementations, and FIGS. 3-6 illustrate example implementations of the corresponding sub-processes of method 200 in greater detail. For ease of reference, the method 200 is described in the example context of the compute system 100 of FIG. 1, but the described is not limited to this particular implementation context. As described above, the hardware-based video codec control process utilizes a video codec token 164 to specify the codec policy to be enforced by the codec driver 134 or other firmware executing in the TEE for encoding/decoding jobs submitted for processing by the graphics hardware resources 106 of the compute system 100. In brief, the video codec token comprises a data structure that includes information that uniquely identifies the hardware device 120 (e.g., a device ID and a device stock keeping unit (SKU), control information representing the video codec access policy to be enforced for the hardware device 120 (e.g., bit fields identifying which codecs are enabled or disabled), a sign field for verification/authentication, and the like.

Thus, as a general operational overview of method 200, at block 202 the compute system 100 obtains a video codec token (codec token 164) for the hardware device 120 from the remote system 136 and then stores the video codec token 164 at token storage 166. Thereafter, in response to a start-up event 204 (e.g., boot up of the compute system 100 or initiation of execution of the video application 128), at block 206 the compute system 100 accesses the codec token 164 from token storage 166, authenticates the codec token 164 in the TEE firmware 118, extracts the codec control information therefrom, and provisions the codec driver 134 to implement the codec policy represented by the extracted codec control information. With the codec driver 134 so provisioned, at block 208 the compute system 100 advertises the available codec capabilities to the video application 128 and the video application 128 coordinates with the OS interface software 124, the graphics driver software 122, and the TEE firmware 118 to create the video data path 162 for submission of encoding/decoding jobs to the graphics hardware resources 106 via the codec driver 134. At block 210, the video application 128 submits such jobs for execution to the codec driver 134, which enforces the provisioned codec policy on any the submitted encoding/decoding jobs and submits those in compliance with the codec policy to the graphics hardware resources 104 for execution, while any encoding/decoding jobs that fails to comply with the codec policy is prevented from being executed by the codec driver 134.

Figure 3:
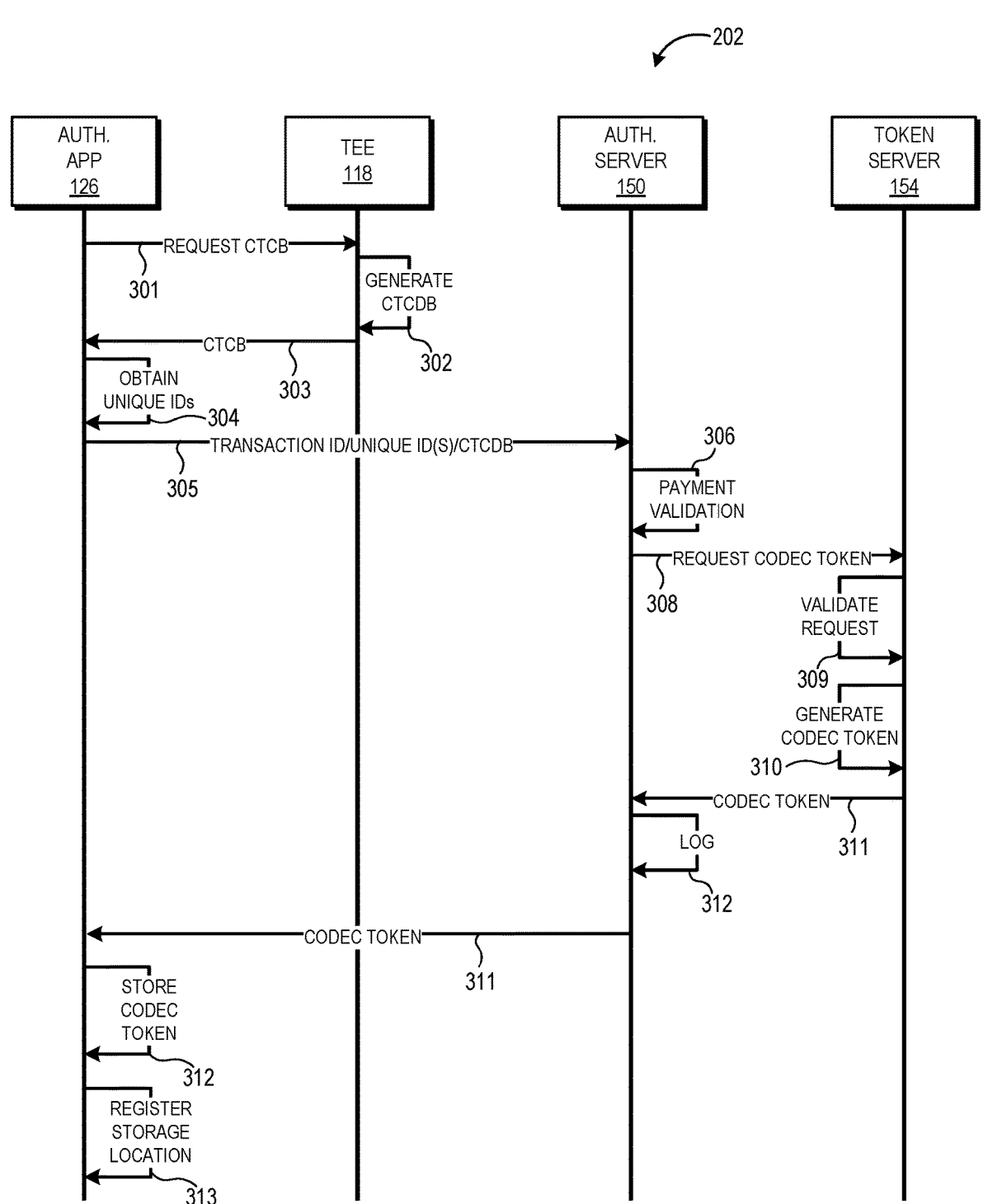
FIG. 3 is a ladder diagram illustrating a video codec token generation and storage process in accordance with some embodiments.

FIG. 3 illustrates, via a ladder diagram, the process of obtaining and storing the video codec token (block 202) in greater detail in accordance with some implementations. In the depicted implementation, the token grant process utilizes a token challenge process based on a codec token challenge data block (CTCDB) that uniquely identifies and represents the specific hardware device 120 of the compute system 100. Accordingly, as an initial step, at action 301 the authorization application 126 creates an authenticated challenge session via an OPM interface provided by the OPM runtime API 142 and sends a CTCDB request or query to the graphics TA module 132 of the TEE firmware 118. In response, at action 302 the graphics TA module 132 of the TEE firmware 118 generates a CTCDB that uniquely represents and authenticates the hardware device 120 of the compute system 100. In at least one implementation, this process includes accessing some or all of the following identifiers and storing them in corresponding fields of the CTCDB: the serial number or other unique ID of the hardware device 120; the SKU information for the hardware device 120; and/or a model ID of the hardware device 120. The graphics TA module 132 then generates a nonce value and stores it in a corresponding field of the CTCDB. This nonce value can be useful in protecting from a replay attack on the data block signing process that follows. The graphics TA module 132 then signs the completed fields of the CTCDB and stores the resulting signing key in a corresponding field of the CTCDB. In at least one implementation, the signing key is generated as Key Derivation Function (KDF) using a Secure Hashing Algorithm (SHA), as signing key=KDF(SHA(key), device ID), where key=a trusted root hardware key, such as a key accessed from a one-time-programmable (OPM) memory. The TEE firmware 118 returns the resulting signed CTCDB 303 to the authorization application 126. At action 304, the authorization application 126 accesses the device ID and/or the device SKU from the CTCDB 303. The authorization application 126 establishes a secure sockets layer (SSL) connection or other secure connection with the authorization server 150 and transmits a token challenge 305 that includes the CTCDB 303, the device ID, the device SKU, and/or a unique transaction ID to the authorization server 150.

At action 306, the authorization server 150 receives the token challenge 305 and uses the included information to determine whether there is any authorized codec configuration for the hardware device 120 identified by the included information. To illustrate, at a previous point, a user may have used a web portal or other interface to purchase or otherwise license certain codec capabilities in perpetuity or for a specified duration, or a vendor or manufacturer may have performed a bulk authorization in which a batch of hardware devices 120, as identified by a common device SKU or common model ID, were authorized with the same codec capabilities. In the event an codec authorization record does not exist for the hardware device 120, the authorization server 150 responds with a denial of the token challenge 305. However, for purposes of FIG. 3, it is assumed that a codec authorization record exists for the hardware device 120. Accordingly, the authorization server 150 determines the codec configuration authorized for use by the hardware device 120 based on the codec authorization record. This authorized codec configuration can include identification of particular codecs authorized for use by the hardware device 120 (or, conversely, particular codecs forbidden from use by the hardware device 120), and, in some implementations, may further include parameters for the use of a corresponding codec, such as limitations on a pixel color depth, limitations on a maximum bit rate, maximum resolution, maximum frame rate, etc. The authorization server 150 then transmits a codec token request 308 to the token server 154 via an SSL connection or other secure connection. In at least one implementation, the codec token request 308 includes the CTCDB 303 and a representation of the authorized codec configuration.

At action 309, the token server 154 validates the codec token request 308 using the signature stored in the CTCDB 303. For example, if signed in the manner described above, the token server 154 can use the device ID from the CTCDB 303 to identify a device-unique endorsement key in an endorsement database accessible by the token server 154 and generate a signing key using the function KDF(SHA (endorsement key), device ID). The token server 154 then compares this signing key with the signing value from the CTCDB 303, and if they match, validates the CTCDB 303. The token server 154 then compares the device ID and/or device SKU provided by the authorization server 150 with the device ID and/or device SKU from the CTCDB 303. In the event they are consistent, then at action 310 the token server 154 generates a codec token (e.g., codec token 164) unique to the hardware device 120 and which includes control data indicating the codec policy to enforce for the hardware device 120 consistent with the authorized codec configuration provided by the authorization server 150. Table 1 below illustrates an example format for the codec token (note that the CTCDB 303 may implement the same or similar format):

TABLE 1

| Field Name | Offset (Hex) | Size (in bytes) | Note |
|---|---|---|---|
| Size | 0x00 | 4 | Required in both CTCDB and Codec Token |
| Version | 0x04 | 4 | Required in both CTCDB and Codec Token |
| Nonce | 0x08 | 16 | Required in both CTCDB and Codec Token |
| Patch Level | 0x18 | 4 | Required in Codec Token |
| Generated Date | 0x1C | 4 | YYYYMMDD, Required in Codec Token |
| Unique Device ID | 0x20 | 16 | Required in both CTCDB and Codec Token |
| Device SKU Information | 0x30 | 16 | Required in both CTCDB and Codec Token |
| Device model ID | 0x48 | 4 | Required in both CTCDB and Codec Token |
| Expiry Date | 0x4C | 4 | Required in Codec Token |
| Account ID | 0x50 | 16 | Required in both CTCDB and Codec Token |
| Codec Control Data | 0x60 | 4 | Bit 0: HEVC enabled Bit 1: H.264 enabled Bit 2: VP9 enabled Bit 3: AV1 enabled Required in Codec Token |
| Data Block Type | 0x64 | 4 | 0: Codec Token Challenge Data Block 1: Codec Token data block |
| Reserved | 0x68 | 8 | |
| Signature | 0x70 | 16 | One-Key Message Authentication Code (CMAC) signature from offset 0x00-0x70. Required in both CTCDB and Codec Token |

With reference to certain fields, as previously noted with respect to the CTCDB, the nonce field can be used to store a nonce value to protect against replay attacks. Moreover, for this example, the codec policy to be enforced pertains to whether four specific video codecs are enabled, namely HEVC, H.264, VP9, and AV1, and is represented in the Codec Control Data field of the codec token. The Secure Patch Level field can be used for codec token revocation in that it indicates the minimal required platform security patch level such that the codec token is only valid when the secure patch level in the codec token is equal or less than platform secure patch level.

The resulting codec token 311 (one embodiment of the codec token 164, FIG. 1) is then transmitted to the authorization server 150, which forwards the codec token 311 to the authorization application 126 (and generates a log event for the transaction in action 312). At action 312, the authorization application 126 stores the codec token 311 in the token storage 166 and then at action 313 configures the compute system 100 so that the graphics driver software 122 can subsequently access the codec token 311. For example, the token storage 166 may comprise the file system provided by the OS and implemented in a hard drive, and thus when the codec token 311 is stored to a particular file in the file system, the authorization software 126 registers the particular file path for the stored codec token 311 in the OS system registry (e.g., "computer\HKEY_LOCAL_MACHINE\SYSTEM\ControlSet001\Control\VCCC") so that the graphics driver software 122 can determine the location of the codec token 311 during driver initialization via access to the OS system registry.

Figure 4:
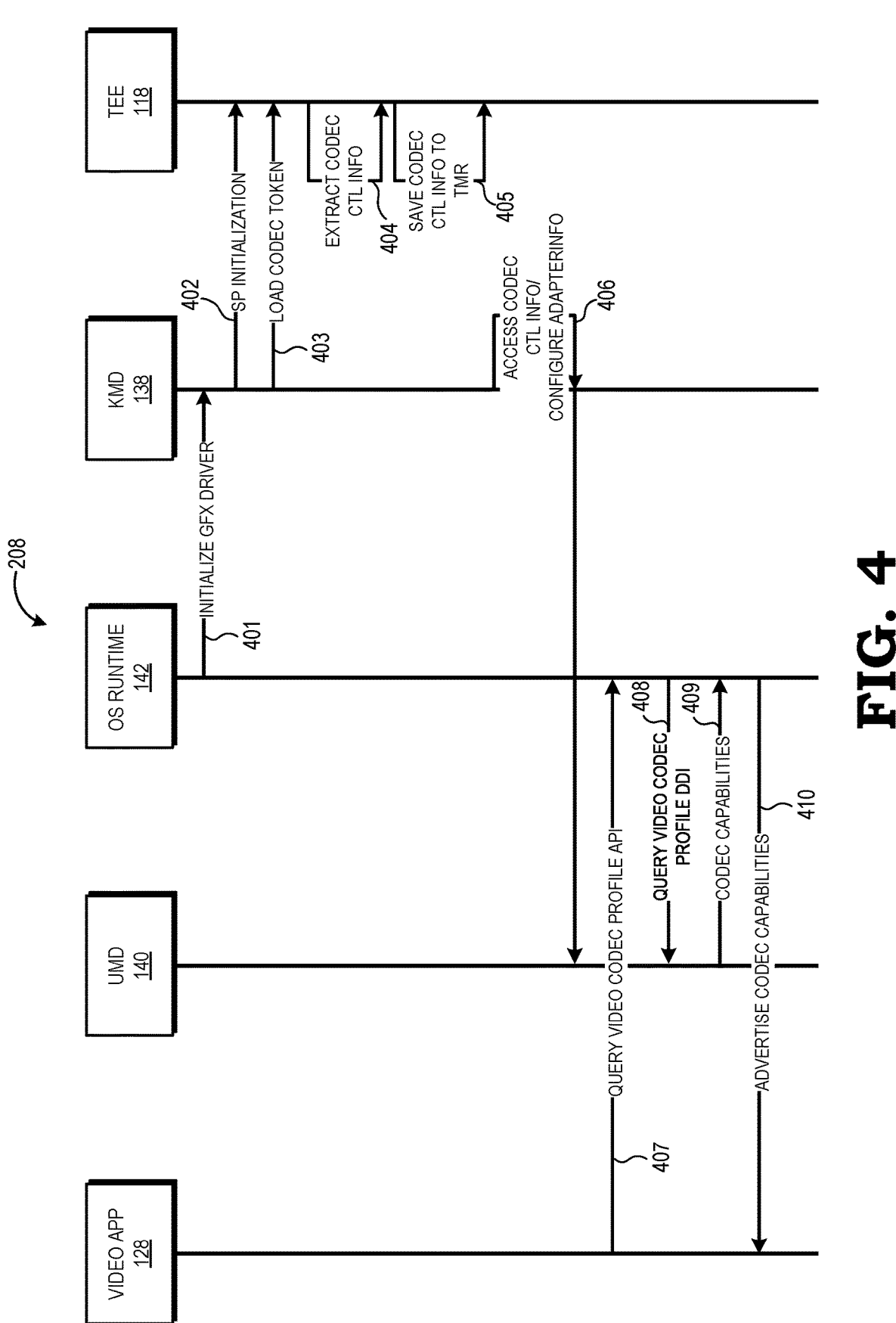
FIG. 4 is a ladder diagram illustrating a video codec capabilities advertisement process in accordance with some embodiments.

FIG. 4 illustrates, via a ladder diagram, the process of advertising the permitted codec capabilities (block 206) in greater detail in accordance with some implementations. As explained above, in some implementations, the lower software levels (software 122 and 124 and firmware 118) coordinate to determine the video codec capabilities available from the graphics hardware resources 104 from the codec token 164 and advertised such codec capabilities to the video application 128 so that the video application 128 can initiate instantiation of a video data path for execution of encoding/decoding jobs consistent with the advertised codec capabilities.

This process begins with the OS runtime API 142 initializing the KMD 138 and UMD 140 (action 401) in response to boot up or another initialization trigger. As part of its initialization process, the KMD 138 signals (action 402) the security processor 110 to initialize the firmware and hardware for the TEE. Further, during initialization, at action 403 the KMD 138 accesses the stored codec token 164 from the token storage 166 (e.g., by reading the file path of the stored codec token 164 from the corresponding OS registry key, as explained above) and passes the codec token 164 to the TEE firmware 118. At action 404, the graphics TA module 132 of the TEE firmware 118 authenticates the codec token 164, and if authenticated, extracts the codec control data from the codec token 164. In some implementations, this authentication process can include the graphics TA module 132 retrieving a device endorsement key and the unique device ID from fuses or other secure settings storage and then generating a signing key using, for example, the function KDF(SHA (endorsement key), device ID), where KDF represents a key derivative function and SHA represents a secure hash algorithm. The TEE firmware 118 then calculates the signature of the codec token 164, and if the calculated signature matches the signature embedded in the codec token 164, the codec token 164 is considered to be authenticated.

At action 405, the graphics TA module 132 or the SP driver 130 stores the accessed codec control data in a secured location of the TEE that is accessible to the codec driver 134. In some implementations, this secured location is a trusted memory region (TMR) 168 (FIG. 1) of the hardware resources 102 of the hardware device 120. The TMR 168 can be implemented as a separate memory, such as static random-access memory (SRAM) of the security processor 110, or as a region of system memory 114 that has access limited to the TEE firmware 118 through one or more security mechanisms. In some implementations, the TMR 168 also stores the firmware implementing the codec driver 134. In other implementations, the secured location is implemented as one or more control registers accessible with limited access. Further, at action 406 a copy of the codec control data, or a representation thereof, is accessed by the KMD 138 and the KMD 138 configures an AdapterInfo data structure to reflect the video codec policy represented by the codec control data. The AdapterInfo data structure is a data structure shared between the KMD 138 and the UMD 140, and thus is used by the KMD 138 to inform the UMD 140 of the codec capabilities available to the hardware device 120.

Thereafter, in anticipation of utilizing the hardware device 120 to provide hardware-based encoding/decoding, the video application 128 queries (action 407) the OS runtime API for the video codec profile of the hardware device 120. In response, the OS runtime API queries the UMD 140 for a video codec profile DDI at action 408. In response to this query, the UMD 140 accesses the AdapterInfo data structure to determine the permitted video codec capabilities and provides a representation of these capabilities (codec capabilities 409) to the OS runtime API 142. The OS runtime API 142 in turn advertises or otherwise provides the supplied codec capabilities 409 to the video application 128 (action 410) as, for example, a reply to the query of action 407.

Figure 5:
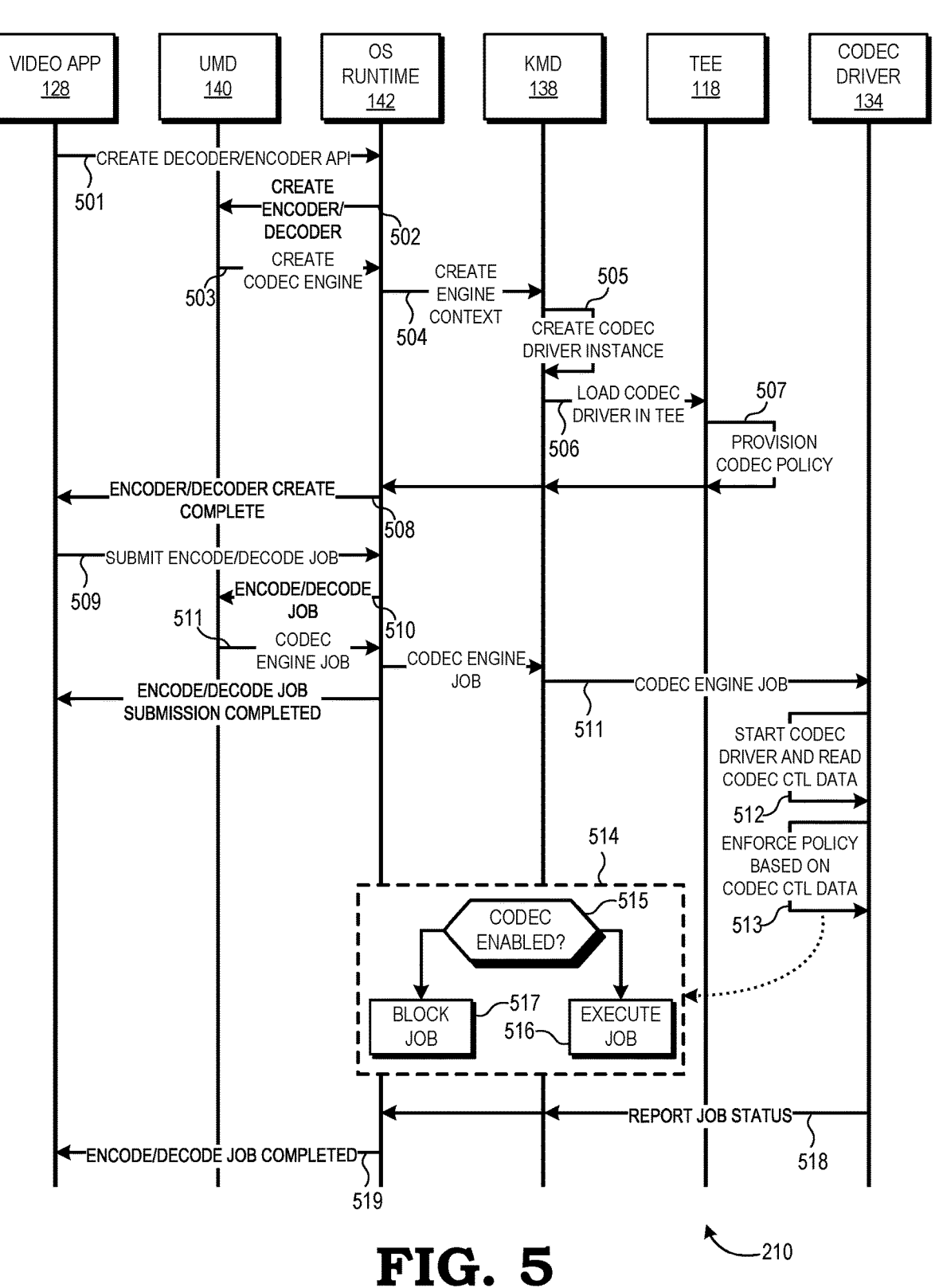
FIG. 5 is a ladder diagram illustrating a video codec path configuration and encoding/decoding execution process in accordance with some embodiments.

FIG. 5 illustrates, via a ladder diagram, the process of establishing a video data path and enforcing codec policy for the video data path as represented by block 210 of method 200 of FIG. 2 in accordance with some implementations. Following advertisement of the codec capabilities to the video application 128 as represented by block 206 of FIGS. 2 and 4, the video application 128 can proceed with establishing a video data path to the graphics hardware resources 104 of the hardware device 120 consistent with the advertised codec capabilities. Accordingly, at action 501, the video application 128 signals a request to create a decoder/encoder API to the OS runtime API 142. In response, the OS runtime API 142 forwards a corresponding request to the UMD 140 to create an encoder/decoder API at action 502. In response, the UMD 140 requests the creation of a codec engine (action 503), which causes the OS runtime API 152 to direct the KMD 138 to create a decoder engine context (action 504). The KMD 138 creates an instance of a codec driver (codec driver instance) at action 505 and directs the TEE firmware 118 to load the codec driver instance as part of the codec driver 134 of the TEE firmware 118 at action 506. This codec driver instance is the KMD driver internal instance that is used for communication between the graphics driver and the codec driver and to handle all decode jobs related to the same playback session. At action 507, the TEE firmware 118 provisions the codec policy for the codec driver 134 so that the codec driver 134 can implement the codec policy for subsequent encoding/decoding jobs from the video application 128. In at least one implementation, this provisioning process includes storing the codec control data in the TMR 168 shared with the firmware of the codec driver 134 (if not already stored in the TMR 168) or configuring the codec driver 134 to refer to the specific storage location of the stored codec control information in the TMR 168. An example implementation of the provisioning process of action 507 is described below with reference to FIG. 6. With the codec driver 134 provisioned to implement the codec policy represented in the codec token 164, the OS runtime API 142 reports completion of the encoder/decoder creation process to the video application 128 (action 508).

With an API configured for a video data path (e.g., video data path 162, FIG. 1) between the video application 128 and the codec drier 134, the video application 128 can begin issuing encode/decode jobs to the created API for processing. As such, when the video application 128 submits an encode/decode job (action 509) to the OS runtime API 142, the OS runtime API 142 forwards the encode/decode job to the UMD 140 (510), and the UMD 140 in turn provides a corresponding codec engine job 511 representing the encode/decode job that is forwarded to the codec driver 134 via the OS runtime API 142, the KMD 138, and the security processor driver 130 to the codec driver 134.

For the first codec engine job 511 submitted for processing by the video data path, at action 512 the codec driver 134 is initiated or otherwise started. As part of this initialization process, the codec driver 134 reads the codec control data from the TMR 168 and configures itself to implement the codec policy represented by the accessed codec control data. For all subsequent codec engine jobs 510, the codec driver 134 is thus already configured.

At action 513, the codec driver 134 enforces the configured codec policy on the received codec engine job 511. Overlay 514 represents this enforcement process. At block 515, the codec driver 134 determines the codec required for the codec engine job 511, as well as any relevant codec parameters that might be limited by the codec policy. The codec driver 134 then determines whether the configured codec policy allows utilization of the required codec. If so, then at block 516 the codec driver 134 allows the codec engine job 511 to be executed by passing the codec engine job 511 to the corresponding graphics hardware resources 104 for execution. Otherwise, if the configured codec policy does not allow utilization of the required codec, then at block 517 the codec engine job 511 is blocked from further processing. For example, the codec control data may represent a policy in which the VP9 and H.264 codecs are enabled but the H.265 and AV1 codecs are disabled, in which case the codec driver 134 is configured to permit further processing of codec engine jobs that utilize a VP9 or H.264 codec resources but to block or otherwise disregard codec engine jobs that require a H.265 or AV1 codec. Further, in some implementations the codec policy may put limitations on an allowed codec. In such instances, enforcement of the codec policy can include blocking outright any codec engine job that is inconsistent with these limitations. For example, assuming a codec policy that limits use of the H.265 codec resources to only 30 frames-per-second (fps) may block outright a codec engine job requiring use of the H.265 codec resources for a frame rate of 60 fps. Alternatively, if the codec engine job can be accommodated with modification, enforcement of the codec policy can include modification of the codec engine job to meet the limitations. For example, the codec policy may set a maximum resolution threshold on the VP9 codec, in which case codec engine job that requires the VP9 codec at a resolution higher than the maximum resolution threshold may be modified so as to be executed at the maximum resolution threshold instead.

For a codec engine job that is accepted for execution under the implemented codec policy, after completion of execution of the codec engine job, the codec driver 134 reports the completed job status (action 518 to the OS runtime API 142 via the KMD 138), and the OS runtime API 142 then reports the encode/decode job as completed to the video application 128 at action 519, at which point the video application 128 can submit another encode/decode job. In the event that a codec job is blocked through policy enforcement, in some implementations the codec driver 134 can issue a job status update that indicates that the encode/decode job was rejected, and in other implementations the codec driver 134 may take no further action, including job status reporting, in response to rejection of a encode/decode job on an assumption that the non-compliant encoded/decode job was issued maliciously.

Figure 6:
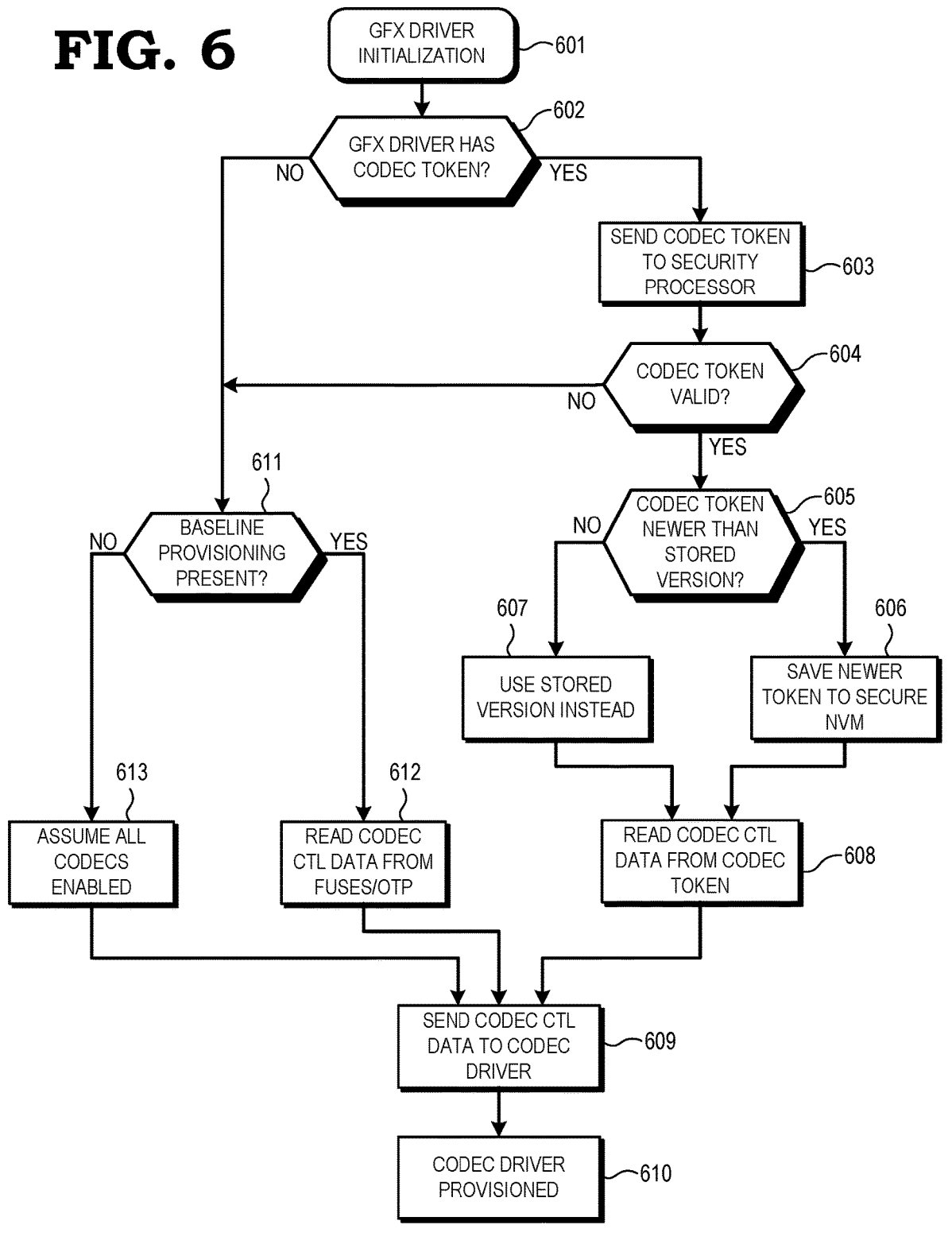
FIG. 6 is a flow diagram illustrating a method for provisioning a hardware codec driver in a trusted execution environment using a video codec token in accordance with some embodiments.

FIG. 6 illustrates a flow chart depicting an example implementation of the codec driver provisioning process of action 512 of FIG. 5 in accordance with some implementations. This process begins at block 601 with the initialization of the graphics driver (e.g., KMD 138). As explained above, the KMD 138 can attempt to access the stored codec token 164 from token storage 166 (block 602). In the event that this access attempt is successful, at block 603 the KMD 138 sends the codec token 164 to the security processor 110 for validation. At block 604 the graphics TA module 132 determines whether the codec token 164 is a valid codec token using, for example, the same or similar authentication process as that described above with regard to action 404 of FIG. 4. In some implementations, the security processor 110 stores a copy of the codec token 164 in the NVM 116 for backup purposes. Thus, if the accessed codec token 164 is determined to be valid, then at block 605 the graphics TA module 132 determines whether the accessed codec token 164 is "newer" than the stored copy in the NVM 116. If the accessed codec token 164 is newer, then at block 606 the security processor 110 replaces its stored copy with the accessed codec token 164 in the NVM 116. Otherwise, if the stored copy is newer, then at block 607 the security processor 110 discards the accessed codec token 164 and uses the stored copy in its place. At block 608, the security processor driver 130 reads the codec control data from the codec token selected for use and sends the codec control data to the codec engine 134 by, for example, storing it to a designated location in the TMR 168 accessible by the codec engine 134. At block 610 the codec engine 134 configures itself to enforce the codec policy represented by the codec control data, and thus completes the provisioning of the codec engine 134 for codec policy enforcement.

However, referring to blocks 602 and 604, in some instances a codec token may not be stored in the token storage 166 or the stored codec token may not be valid. For example, the file system storing the codec token may have been corrupted or erased, or the stored codec token may have been modified in an attempt to bypass the codec limitations. In either case, rather than relying on the invalid or missing codec token, the security processor 110 instead may determine at block 611 whether the hardware device 120 has any baseline, or default, codec provisioning implemented. For example, in some implementations the hardware device 120 may employ OTP memory or fuses to specify a default codec policy to be employed at the hardware device 120 in the absence of a valid codec token. This default codec policy could include, for example, enabling certain open-source or older codecs while blocking proprietary or more advanced codecs. If fuses or OTP memory are used for such, then at block 612 the security processor driver 130 reads the default codec control data from the corresponding fuses/OTP memory and this default codec control data is provided to the codec driver 134 for provisioning the codec driver 134 to implement the corresponding codec policy at blocks 609 and 610. Otherwise, if no baseline provisioning is present, then at block 613 the security processor 110 may assume that all codecs are enabled and at blocks 609 and 610 the codec driver 134 is provisioned accordingly.

The token-based video codec control technique depicted in FIGS. 1-6 provides a robust, scalable, and secure process for selective provisioning of video codec resource of a hardware device. To illustrate, reliance on a video codec token acquisition process that includes authentication and enablement by a remote server allows a manufacturer, supplier, or third party to implement codec provisioning on a broad scale, while permitting both individual device provisioning as well as batch provisioning based on model, SKU, etc. Moreover use of a codec token, and the codec control data contained therein, that is both verified and implemented within a TEE provides increased protection against unauthorized utilization of disallowed codec resources by making both the control data representing such codec limitations and the driver firmware that serves as the gatekeeper for implementing such codec limitations difficult to access due to their fenced-off implementation within the TEE itself. Moreover, because the codec control data representing the codec policy to be enforced for the hardware device 120 is securely stored at the hardware device 120 itself, the hardware device 120 may be transitioned between compute systems and the previously-obtained codec token may be reutilized within the new compute system without requiring a repeat of the token challenge process for obtaining a codec token from the remote system.

In some implementations, the apparatus and techniques described above are implemented in a system including one or more integrated circuit (IC) devices (also referred to as integrated circuit packages or microchips), such as the hardware device 120 described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

In some implementations, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:

executing, in a trusted execution environment of a compute system, firmware for controlling graphics hardware of a device that supports a plurality of video codecs;

obtaining, at the device, codec control data specific to the device from a remote system; and implementing, at the device, a codec policy for selectively providing access to the plurality of video codecs based on the codec control data.

2. The method of claim 1, wherein obtaining the codec control data comprises:

sending a request for a device-specific codec token to a remote system via one or more networks, the request including a data structure including one or more identifiers associated with the device and a first signing key for authenticating the device to the remote system; and receiving, from the remote system, the requested device-specific codec token, the device-specific codec token including a data structure including the codec control data and a second signing key for verifying the device-specific codec token at the trusted execution environment.

3. The method of claim 2, wherein:

obtaining the codec control data further comprises storing the device-specific codec token in a file system of the compute system; and implementing the codec policy comprises:

accessing the device-specific codec token from the file system;

verifying the device-specific codec token by firmware in the trusted execution environment;

responsive to verifying the device-specific codec token, storing codec control data from the device-specific codec token at a trusted memory region accessible to the firmware executing in the trusted execution environment; and initializing a codec driver for the graphics hardware of the device from the codec control data in the trusted memory region.

4. The method of claim 2, wherein the one or more identifiers comprise at least one of: a device identifier, a model identifier, or a stock keeping unit (SKU) identifier.

5. The method of claim 2, further comprising:

acquiring, through the remote system, access to one or more video codecs for the device prior to sending the request for the device-specific codec token.

6. The method of claim 1, wherein implementing the codec policy comprises:

verifying the codec control data by firmware in the trusted execution environment;

responsive to verifying the codec control data, storing the codec control data at a trusted memory region accessible to the firmware executing in the trusted execution environment; and initializing a codec driver for the graphics hardware of the device from the codec control data in the trusted memory region.

7. The method of claim 1, wherein:

the codec policy permits access to a first set of one or more video codecs and prohibits access to a second set of one or more video codecs; and implementing the codec policy comprises:

permitting an encode/decode job to be provided to the graphics hardware for processing responsive to the encode/decode job requesting utilization of a video codec of the first set; and blocking the encode/decode job from being provided to the graphics hardware for processing responsive to the encode/decode job requesting utilization of a video codec of the second set.

8. The method of claim 1, further comprising:

providing, via an application programming interface (API), a representation of codec capabilities available to a video application based on the codec control data.

9. The method of claim 1, wherein the firmware is accessed from a secure memory associated with a security processor and executed by the security processor.

10. The method of claim 9, further comprising storing a copy of the codec control data at a non-volatile memory associated with the security processor.

11. An apparatus comprising:

a device having a security processor to provide a trusted execution environment and graphics hardware that supports a plurality of video codecs, the device to:

execute firmware at the security processor for controlling the graphics hardware;

obtain codec control data specific to the device from a remote system; and implement a codec policy for selectively providing access to the plurality of video codecs at the graphics hardware based on the codec control data.

12. The apparatus of claim 11, wherein the device is to implement the codec policy by:

verifying the codec control data using the firmware executed by the security processor;

responsive to verifying the codec control data, storing the codec control data at a trusted memory region accessible to the firmware executing by the security processor; and initializing, in the trusted execution environment, a codec driver for the graphics hardware from the codec control data in the trusted memory region.

13. The apparatus of claim 12, wherein:

the codec policy permits access to a first set of one or more video codecs and prohibits access to a second set of one or more video codecs; and the device is to implement the codec policy by:

permitting an encode/decode job to be provided to the graphics hardware for processing responsive to the encode/decode job requesting utilization of a video codec of the first set; and blocking the encode/decode job from being provided to the graphics hardware for processing responsive to the encode/decode job requesting utilization of a video codec of the second set.

14. The apparatus of claim 11, wherein the firmware is accessed from a secure memory associated with the security processor.

15. The apparatus of claim 11, wherein the device further is to:

store a copy of the codec control data at a non-volatile memory associated with the security processor.

16. The apparatus of claim 11, further comprising:

a central processing unit (CPU); and system memory coupled to the CPU and storing software to manipulate the CPU to provide, via an application programming interface (API), a representation of codec capabilities available to a video application based on the codec control data.

17. The apparatus of claim 11, further comprising:

a central processing unit (CPU); and system memory coupled to the CPU and storing software to manipulate the CPU to:

send a request for a device-specific codec token to a remote system via one or more networks, the request including a data structure including one or more identifiers associated with the device and a first signing key for authenticating the device to the remote system; and receive, from the remote system, the requested device-specific codec token, the device-specific codec token including a data structure including the codec control data and a second signing key for verifying the device-specific codec token at the trusted execution environment.

18. The apparatus of claim 17, wherein:

the software is further to manipulate the CPU to store the device-specific codec token in a file system of the apparatus; and the device is to implement the codec policy by:

accessing the device-specific codec token from the file system; verifying the device-specific codec token by firmware in the trusted execution environment;

responsive to verifying the device-specific codec token, storing codec control data from the device-specific codec token at a trusted memory region accessible to the firmware executing in the trusted execution environment; and initializing a codec driver for the graphics hardware of the device from the codec control data in the trusted memory region.

19. The apparatus of claim 17, wherein the device is to implement the codec policy by:

verifying the device-specific codec token by firmware in the trusted execution environment;

responsive to verifying the device-specific codec token, storing codec control data from the device-specific codec token at a trusted memory region accessible to the firmware executing in the trusted execution environment; and initializing a codec driver for the graphics hardware of the device from the codec control data in the trusted memory region.

20. The apparatus of claim 11, wherein:

the codec policy permits access to a first set of one or more video codecs and prohibits access to a second set of one or more video codecs; and the device is to implement the codec policy by:

permitting an encode/decode job to be provided to the graphics hardware for processing responsive to the encode/decode job requesting utilization of a video codec of the first set; and blocking the encode/decode job from being provided to the graphics hardware for processing responsive to the encode/decode job requesting utilization of a video codec of the second set.

* * * * *